(12) United States Patent
Zhang et al.

(10) Patent No.: US 7,584,100 B2
(45) Date of Patent: Sep. 1, 2009

(54) METHOD AND SYSTEM FOR CLUSTERING USING GENERALIZED SENTENCE PATTERNS

(75) Inventors: Benyu Zhang, Beijing (CN); Wei-Ying Ma, Beijing (CN); Zheng Chen, Beijing (CN); Hua-Jun Zeng, Beijing (CN)

(73) Assignee: Microsoft Corporation, Redmond, WA (US)

( * ) Notice: Subject to any disclaimer, the term of this patent is extended or adjusted under 35 U.S.C. 154(b) by 754 days.

(21) Appl. No.: 10/880,662

(22) Filed: Jun. 30, 2004

(65) Prior Publication Data

US 2006/0004561 A1    Jan. 5, 2006

(51) Int. Cl.
G06K 9/00       (2006.01)
G06K 9/62       (2006.01)
G06F 17/27      (2006.01)
G10L 15/06      (2006.01)
G10L 19/00      (2006.01)
G06F 7/00       (2006.01)

(52) U.S. Cl. .................. 704/245; 382/170; 382/225; 704/9; 704/243; 704/500; 707/1; 707/3; 707/100

(58) Field of Classification Search .................. 704/245
See application file for complete search history.

(56) References Cited

U.S. PATENT DOCUMENTS 6,751,614 B1 *  6/2004  Rao ............................ 707/5

2003/0154196 A1 *  8/2003  Goodwin et al. ............... 707/3
2005/0154690 A1 *  7/2005  Nitta et al. ..................... 706/46

OTHER PUBLICATIONS

Cutting et al., 'Scatter/Gather: A Cluster-based Approach to Browsing Large Document Collections', Proceedings of the 15th annual international ACM SIGIR conference on Research and development in information retrieval, Copenhagen, Denmark; pp. 318-329, 1992.*
Leuski et al., 'eArchivarius: Accessing Collections of Electronic Mail', SIGIR '03, Jul.-Aug. 2003, Toronto, Canada.*
Zamir et al., 'Web Document Clustering: A Feasibility Demonstration' SIGIR '98, Melbourne, Australia; 1998, pp. 46-54.*
Basu, Sugato et al., "Semi-Supervised Clustering By Seeding," Proceedings of the 19th Internaitonal Conference on Machine Learning (ICML-2002), Sydney, Australia, Jul. 2002 (ages 19-26,).

(Continued)

*Primary Examiner*—David R Hudspeth
*Assistant Examiner*—Justin W Rider
(74) *Attorney, Agent, or Firm*—Perkins Coie LLP (57) ABSTRACT

A method and system for clustering documents based on generalized sentence patterns of the topics of the documents is provided. A generalized sentence patterns ("GSP") system identifies a "sentence" that describes the topic of a document. To cluster documents, the GSP system generates a "generalized sentence" form of the sentence that describes the topic of each document. The generalized sentence is an abstraction of the words of the sentence. The GSP system identifies clusters of documents based on the patterns of their generalized sentences. The GSP system clusters documents when the generalized sentence representations of their topics have a similar pattern.

13 Claims, 10 Drawing Sheets

OTHER PUBLICATIONS

Hatzivassiloglou, Vasileios et al., "An Investigation of Linguistic Features and Clustering Algorithms for Topical Document Clustering," 2000 ACM (8 pages).

Zaki, Mohammed J. et al., "CHARM: An Efficient Algorithm for Closed Itemset Mining," Computer Science Department, Rensselaer Polytechnic Institute, Troy, New York, 2002 (17 pages).

Pasquier, Nicolas et al., "Discovering Frequent Closed Itemsets for Associated Rules," 1999 (19 pages).

Heidorn, George E., "Intelligent Writing Assistance," 1999 (26 pages).

\* cited by examiner

METHOD AND SYSTEM FOR CLUSTERING USING GENERALIZED SENTENCE PATTERNS

TECHNICAL FIELD

The described technology relates to identifying clusters of documents, such as electronic mail messages, that are directed to the same topic.

BACKGROUND

The World Wide Web is increasingly becoming a more important and more frequently used form of communication between people. The primary form of web-based communication is electronic mail. Other forms of communication are also used, however, such as news groups, discussion groups, bulletin boards, voice-over IP, and so on. Because of the vast amount of information that is available on the web, it can be difficult for a person to locate information that may be of interest. For example, a person who receives hundreds of electronic mail messages a day may find it impractical to take the time to store the messages in folders of the appropriate topic. As a result, it may be difficult for the person to later find and retrieve all messages related to the same topic. A similar situation arises when a person tries to locate news groups or discussion groups of interest. Because there may be no effective indexing of these groups, it can be difficult for the person to find groups related to the topic of interest.

Some attempts have been made to help the retrieval of information of interest by creating web directories that provide a hierarchical organization of web-based information. The process of creating the directories and deciding into which directory a particular piece of information (e.g., a news group) should go is typically not automated. Without an automated approach it is impractical to handle the massive amounts of web-based information that are being generated on a daily basis. Moreover, because a person may not be fully aware of the entire web directory hierarchy or may not fully understand the semantics of information, the person may place the information in a directory that is not the most appropriate, making later retrieval difficult. It would be desirable to have an automated technique that would help organize such information.

SUMMARY

A method and system for identifying clusters of documents is provided. In one embodiment, the system identifies generalized sentence patterns for a topic sentence of each document. The system then applies a cluster identification algorithm to identify clusters of the topic sentences using the generalized sentence patterns to guide the identification. The system then organizes the documents according to the clusters of their topic sentences. The system may also automatically generate a name for each cluster derived from the generalized sentence patterns of the cluster.

DETAILED DESCRIPTION

A method and system for clustering documents based on the generalized sentence patterns of the topics of the documents is provided. In one embodiment, a generalized sentence pattern ("GSP") system identifies a "sentence" that describes the topic of a document. The term "sentence," as used in this description, refers to a complete sentence, a sentence fragment, or any collection of words. For example, an electronic mail message is a document, and a sentence that describes the topic of the message may be the content of the subject line, which is generally not a complete sentence. To cluster documents, the GSP system generates a "generalized sentence" form of each sentence that describes the topic of each document. A generalized sentence is an abstraction or generalization of the words (e.g., nouns) of the sentence. For example, the subject line of an electronic mail message may be "Talk by John Smith on May 10, 2003." The noun "person" may be generalized from "John Smith," the noun "date" may be generalized from "May 23, 2003," the noun "talk" might not be generalized, and the stop words "by" and "or" may be removed. In this way, the GSP system can automatically create folders of related documents. In the example, the corresponding generalized sentence is "talk person date." The GSP system identifies clusters of documents based on the patterns of their generalized sentences derived from their topic sentences. For example, the subject line of another electronic mail message may be "Presentation by Jane Doe on Apr. 1, 2004." The corresponding generalized sentence may be "presentation person date." Since the subject lines of the two sample electronic mail messages have no non-stop word in common and the content of the messages may be completely unrelated, traditional information retrieval techniques would typically not find these messages to be related. In contrast, the GSP system identifies that the generalized sentences of their topic sentences do have a similar pattern (e.g., "talk" or "presentation" followed by "name date"). Because the pattern of their generalized sentences is similar, the messages are considered related in some way and the GSP system clusters the messages together (e.g., places them in the same folder).

In one embodiment, the GSP system identifies "generalized sentence patterns" that occur within a set of generalized sentences. The generalized sentences that are similar to the same generalized sentence pattern may be considered to be directed to a related topic. One generalized sentence may be a subset of another generalized sentence in that the superset generalized sentence contains all the words of the subset generalized sentence. For example, the generalized sentence "talk person" is a subset of the generalized sentence "talk person date." The GSP system selects as generalized sentence patterns those generalized sentences that frequently occur as subsets of other generalized sentences. For example, the GSP system may use a frequent itemset algorithm to identify the generalized sentence patterns from the generalized sentences. The GSP system then uses the generalized sentence patterns to place the generalized sentences into clusters of related topics. The GSP system may create a folder for each cluster and store the underlying documents in the folders into which the generalized sentences of their topics were clustered. More generally, the concept of generalized sentence patterns can be used to cluster, classify, organize, search for, and otherwise process and access documents that are related.

In one embodiment, the GSP system uses the identified generalized sentence patterns to guide the clustering process. The GSP system could assume that each generalized sentence pattern represents a different cluster, and it could place each document into the cluster whose generalized sentence pattern most closely matches the generalized sentence of the document. In practice, however, there may be many redundant generalized sentence patterns or many of the generalized sentence patterns may define too detailed a level of clustering. In such a case, the GSP system may attempt to remove redundancies and group together generalized sentence patterns that are similar at a more general level to represent groups of similar generalized sentence patterns. For example, since the generalized sentence pattern "talk person date" may be redundant with the generalized sentence pattern "presentation person date," the GSP system may remove one of them. Also, the generalized sentence patterns "talk date" and "talk person" may represent too detailed a level. As a result, the GSP system may group them together as representing a single set of generalized sentence patterns. If the number of groups of generalized sentence patterns is still too large to effectively represent different topics, the GSP system may select a subset of the groups to guide the clustering process. In one embodiment, the GSP system selects a subset based on the lengths of the generalized sentence patterns within each group. For example, the GSP system may select the groups of generalized sentence patterns that have generalized sentence patterns with the longest lengths. The GSP system then applies a clustering algorithm using the selected groups of generalized sentence patterns to guide the clustering process. Each cluster may ultimately correspond to multiple groups of generalized sentence patterns. That is, generalized sentences that match different generalized sentence patterns may be clustered together. For example, the generalized sentence patterns of "presentation person date" and "talk person date" may be grouped together to define a single cluster. In such a case, the GSP system would place other generalized sentences that match either generalized sentence pattern in the cluster.

In one embodiment, the GSP system automatically generates a name for each cluster. The GSP system selects the generalized sentence pattern from within the group of generalized sentence patterns of the cluster that best represents the generalized sentences of the cluster. For example, if a cluster has the generalized sentence patterns "presentation person date" and "talk person date" and most of the generalized sentences within the cluster match "talk person date," then the GSP system may select "talk person date" as the name of the cluster. If, however, the GSP system is unable to determine a generalized sentence that best represents the generalized sentence patterns of the cluster, then it may select representative words from the generalized sentences themselves as the name of the cluster. For example, if the cluster described above had an equal number of generalized sentences that matched "presentation person" and "talk date," then the GSP system might select the name of the cluster to be "presentation/talk." In this way, the GSP system can not only automatically organize documents, but it can also define meaningful names for the clusters of documents.

In the following, an embodiment of the GSP system that clusters electronic mail messages is described. One skilled in the art will appreciate that the GSP system can be used to cluster documents of any type, such as news group and discussion group postings, press releases, archived documents, patents, recognized voice mail messages, and so on. More generally, the GSP system can be used to cluster sentences that may or may not be related to different underlying documents. For example, the sentences may be the first sentence of each paragraph of a lengthy report for which a person wants to identify related paragraphs. One skilled in the art will appreciate that the topic sentences of the documents can be identified in various ways. For example, a topic sentence for a report may be its title or derived from its abstract or from keywords of its content. More generally, the sentences can be any sentence and not necessarily related to a topic. For example, the GSP system can cluster all the sentences of a collection of electronic mail messages. If the messages are sent by customers requesting support for a product, then the clusters could be analyzed to detect various trends in support requests.

Figure 1:
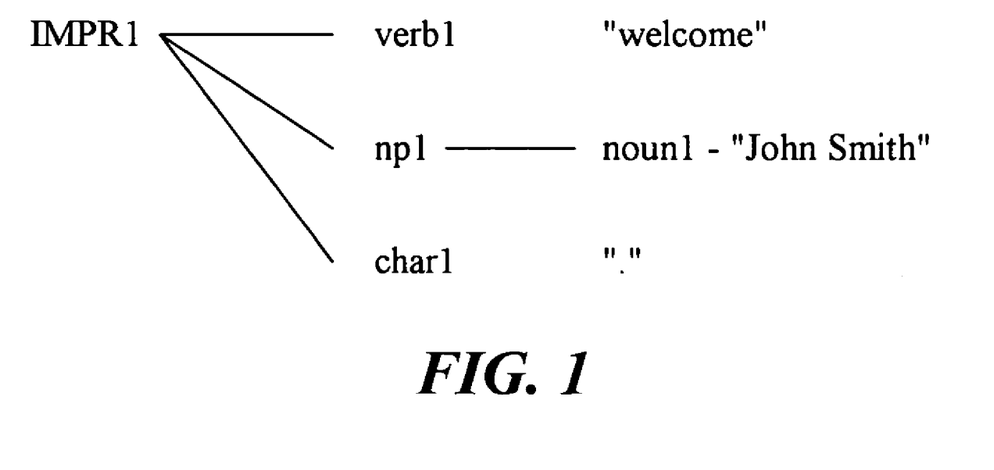
FIG. 1 is an example of a syntax tree generated for the sentence "Welcome John Smith."

In one embodiment, the GSP system uses a natural language processor to generate the generalized sentences. The natural language processor takes a sentence as input and builds a syntax tree for the sentence. FIG. 1 is an example syntax tree generated for the sentence "Welcome John Smith." As can be seen, the part of speech of each word is identified: "welcome" is a verb and "John Smith" is a noun. The natural language processor then generates generalizations of the parts of speech for nouns or noun phrases, such as person, date, and place. For example, the natural language processor may generalize the noun "John Smith" to "person." The resulting generalized sentence is "welcome person." The generalization captures the semantic meaning of the nouns. The natural language processor may use a statistical language model to identify the generalization. One suitable natural language processor is NLPWin, which is described in G. Heidorn, "Intelligent Writing Assistance," *Handbook of Natural Language Processing*, edited by R. Dale, H. Moisl, and H. Somers (M. Dekker, New York, 1999), which is hereby incorporated by reference.

After generating the generalized sentences, the GSP system identifies generalized sentence patterns within the generalized sentences. A generalized sentence pattern may be defined as a generalized sentence, that is, one that has sufficient "support" within the generalized sentences to represent a pattern. In one embodiment, the support for a generalized sentence to be a generalized sentence pattern indicates the number of generalized sentences that are supersets of (or contain) the generalized sentence. For example, since the generalized sentence "welcome person date" contains the generalized sentence "welcome person," it supports "welcome person" as a generalized sentence pattern. Support may be defined more formally as:

$$\sup(p) = |\{s | s \in S \land p \subseteq s\}| \qquad (1)$$

where sup(p) represents the support of generalized sentence p to be a generalized sentence pattern and s is a generalized sentence in the set of sentences S. According to this definition, support of a generalized sentence is a count of the number of generalized sentences that contain that generalized sentence. A generalized sentence pattern may be defined when:

$$\sup(p) >= \min\_sup \quad (2)$$

where min_sup is the minimum support needed for a generalized sentence to be considered a generalized sentence pattern.

The GSP system may apply frequent itemset mining techniques directly to the generalized sentences to identify the generalized sentence patterns in a set of generalized sentences, rather than calculating the support for each generalized sentence, which can be computationally complex. Frequent itemsets, however, may contain a lot of redundant information. For example, if an itemset p has the same support as one of its supersets q and both of them are frequent, then p is redundant because it provides no more information than its superset q. To eliminate redundant generalized sentence patterns, the GSP system uses a mining technique to identify frequent "closed" itemsets. An itemset is closed when all of its superset itemsets are less frequent than the itemset itself. Since the set of frequent closed itemsets may be much smaller than the complete set of frequent itemsets, it is a more concise representation of the complete set of frequent itemsets without information loss. The GSP system can be adapted to use any of a variety of frequent closed itemset mining algorithms to mine "closed" generalized sentence patterns. For example, a suitable frequent closed itemset mining algorithm is described in M. Zaki and C. Hsiao, "CHARM: An Efficient Algorithm for Closed Itemset Mining" (SDM, 2002). One skilled in the art will appreciate that the GSP system can be used with closed or not closed generalized sentence patterns. Thus, in the following, the term "generalized sentence patterns" will be used to refer to either closed or not closed generalized sentence patterns. One skilled in the art will also appreciate that the generalized sentence patterns that are mined may not be identical to any one of the generalized sentences, but rather they may contain words derived from different generalized sentences.

Although mining closed generalized sentence patterns can reduce the number of identified generalized sentence patterns substantially, there still can be some redundancy in the set of closed generalized sentence patterns. For example, if the subjects of most of the electronic mail messages about talks given by some persons take the form of "Talk by somebody on some date," but there are a few electronic mail messages without the specific date in the subjects, then the frequent closed itemsets mining algorithm may produce two generalized sentence patterns: "talk person date" and "talk person." These two generalized sentence patterns actually represent electronic mail messages that should be clustered together.

To help ensure that these similar generalized sentence patterns do not result in two different clusters, the GSP system groups similar generalized sentence patterns together and clusters based on those groups. The similarity of generalized sentence patterns is defined as:

$$sim(p, q) = \begin{cases} 1, & p \subset q \land \frac{\sup(q)}{\sup(p)} \geq \min\_conf \\ 0, & \text{otherwise} \end{cases} \quad (3)$$

where sim(p,q) represents the similarity of generalized sentence pattern p to generalized sentence pattern q and min_conf represents the minimum confidence needed to establish similarity. Conceptually, p is similar to q when p is contained in q and the support for q is near the support for p. For example, if q contains p and sup(p) is 100 and sup(q) is 99, then p and q each contain 99 generalized sentences that are the same. Thus, p and q likely represent the same cluster of electronic mail messages. The GSP system considers the similarity values to define a similarity graph with the generalized sentence patterns as nodes and the similarity values as links. The GSP system may apply a single-link clustering algorithm to the graph to group similar generalized sentence patterns together. Single-link clustering is described in Sneath, P. H. A. and Sokal, R. R., "Numerical Taxonomy," Freeman, London, UK, 1973.

In one embodiment, the GSP system may select only some of the groups of generalized sentence patterns to guide the clustering of the generalized sentences. Since the number of groups of generalized sentence patterns can be much larger than the number of clusters needed to effectively organize the documents, the use of all the groups to guide the clustering may result in too many clusters. The GSP system may select groups of generalized sentence patterns that have longer generalized sentence patterns to guide the clustering because longer generalized sentence patterns should result in more accurate clustering. The GSP system sorts the groups first in descending order of length of the group, and second in descending order of support of the group within groups with the same length. The length of a group may be defined as the maximum length of a generalized sentence pattern in that group, and the support of a group may be defined as the maximum support of a generalized sentence pattern in that group. The GSP system may use a parameter sp_num to control how many groups are selected for clustering. One skilled in the art will appreciate that other techniques may be used for selecting groups of generalized sentence patterns to guide the clustering. For example, the groups can be selected based on the average length of the generalized sentence patterns in the group, the number of generalized sentence patterns in a group, or the width of the range of diverse (i.e., dissimilar) generalized sentence patterns.

The GSP system may use various algorithms to cluster the generalized sentences using the groups of generalized sentence patterns as a guide. The use of the patterns to guide the clustering may be considered a form of semi-supervised learning. In one embodiment, the GSP system uses a COP-KMeans algorithm to cluster the generalized sentences. The GSP system treats the groups of generalized sentence patterns as constraints. A constraint specifies that if two generalized sentences match the same group, then they are to be in the same cluster. However, if two generalized sentences do not match, they can be in the same or different clusters. A generalized sentence matches a group when the generalized sentence is a superset of a generalized sentence pattern of the group. Algorithm 1 shows pseudo-code of an algorithm, referred to as GSP-COPKM, for clustering generalized sentences using a COP-KMeans approach. The GSP-COPKM algorithm takes three parameters: the desired number of clusters k, the number of groups of generalized sentence patterns sp_num, and the set of generalized sentences D. The GSP-COPKM algorithm first uses the GSP groups to generate constraints (i.e., "must-link" constraints in COP-KMeans terminology) and then performs the COP-KMeans algorithm, which is described in K. Wagstaff et al., "Constrained K-Means Clustering With Background Knowledge" (ICML, 2001) 577-584, which is hereby incorporated by reference.

Algorithm 1: GSP-COPKM

GSP-COPKM (k, GSP groups $G_1, G_2, \ldots G_{sp\_num}$, set D)
1. Generate "must-link" constraints Con from $G_i$, i=1, ..., sp_num;
2. Select k generalized sentences as initial cluster centers $C_1, C_2, \ldots, C_k$;
3. For each d∈D, assign d to the closest cluster $C_i$ such that the constraints Con are not violated;
4. For each cluster $C_i$, update its centers by averaging all its generalized sentences;
5. Repeat 3 and 4 until convergence.

In another embodiment, the GSP system uses an algorithm that forms a pseudo-class for the generalized sentences matching the selected groups of generalized sentence patterns. The algorithm then uses a discriminative variant of the Classification Expectation Maximization ("CEM") algorithm to identify the final clusters. The CEM algorithm is described in G. Celux, and G. Govaert, "Comparison of the Mixture and the Classification Maximum Likelihood in Cluster Analysis," Journal of Statistical Computation and Simulation, 47:127-146 (1993), which is hereby incorporated by reference. The GSP system may use a linear support vector machine ("SVM") as the underlying classifier. Algorithm 2 shows pseudo-code of an algorithm, referred to as GSP-DCEM, for clustering generalized sentences using the CEM algorithm. The algorithm uses the same parameters as the GSP-COPKM algorithm. The sp_num parameter is selected to be no greater than the desired number of clusters k. The GSP-DCEM algorithm uses the groups to construct initial pseudo-classes. In each iteration, the SVM classifier is fed by the classification output of the last iteration. Only the generalized sentences not matching any group of generalized sentence patterns are classified—generalized sentences are not reclassified. The iterations stop when the classifications converge or a predefined iteration limit is reached. The algorithm puts a generalized sentence into a class only when the maximal posterior probability of the generalized sentence being in that class is greater than a given threshold. Otherwise, the algorithm puts the generalized sentence into a special class $D_{other}$. When the iterations stop, the algorithm clusters the unclassified generalized sentences in $D_{other}$ into clusters (e.g., k-sp_num clusters) using a basic K-Means algorithm.

Algorithm 2: GSP-DCEM

GSP-DCEM (k, GSP groups $G_1, G_2, \ldots G_{sp\_num}$, generalized sentence set D)
1. Construct sp_num pseudo-classes using GSP groups, $D_i^0 = \{d | d \in D \text{ and } d \text{ match } G_i\}$, i=1, 2, ..., sp_num;
2. $D^1 = D - \cup_{i=1}^{sp\_num} D_i^0$;
3. Iterative until converge. For the j-th iteration, j>0:
   i. Training an SVM classifier based on $D_i^{j-1}$, i=1, ..., sp_num;
   ii. For each generalized sentence d∈D', classify d into class $D_i^{j-1}$ if $P(D_i^{j-1}|d)$ is the maximal posterior probability and $P(D_i^{j-1}|d) \geq$ min_class_prob;
4. $D_{other} = D - \cup_{i=1}^{sp\_num} D_i^j$;
5. Use basic K-Means to partition $D_{other}$ into (k-sp_num) clusters.

In one embodiment, the GSP system generates a name for each of the clusters automatically. When generalized sentences within a cluster generally match the groups of generalized sentence patterns of the cluster, then the GSP system selects a generalized sentence pattern within a group of the cluster as the name of the cluster. For example, the GSP system may select the generalized sentence pattern of the cluster with the highest support from the generalized sentences of the cluster as the name. Otherwise, the GSP system may select top ranked words of the generalized sentences of the cluster as the name of the cluster. The GSP system may rank the words of the generalized sentences as follows:

$$\text{Rank}(t_k) = \frac{\sum_{d_i \in C_j} t_{ki}}{\ln\left(1 + \sum_{d_i} t_{ki}\right)} \quad (4)$$

where $C_j$ denotes the cluster, $d_i$ is a generalized sentence, $t_k$ is a word, and $t_{ki}$ is the importance of word $t_k$ in the generalized sentence $d_i$. The importance of a word can be calculated using conventional term frequency by inverse document frequency techniques (i.e., TF*IDF).

Figure 2:
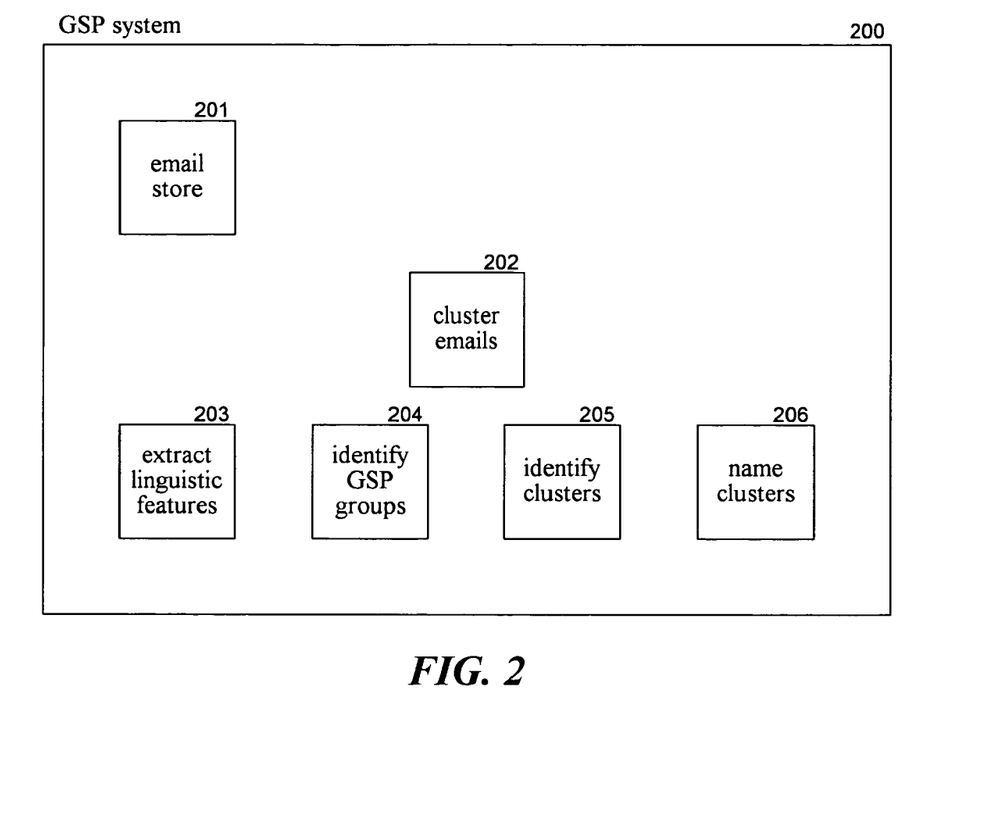
FIG. 2 is a block diagram that illustrates the components of a GSP system in one embodiment.

FIG. 2 is a block diagram that illustrates the components of a GSP system in one embodiment. The GSP system 200 includes an email store 201, a cluster emails component 202, an extract linguistic features component 203, an identify GSP groups component 204, an identify clusters component 205, and a name clusters component 206. The email store contains the set of electronic mail messages that are to be clustered. The cluster emails component invokes the other components to cluster the electronic mail messages of the email store. The extract linguistic features component generates the generalized sentences for the subjects of the electronic mail messages. The identify GSP groups component identifies generalized sentence patterns, groups the generalized sentence patterns, and then selects groups to guide the clustering. The identify clusters component identifies the clusters using the identified groups of generalized sentence patterns to guide the clustering. The name clusters component selects a generalized sentence pattern within a cluster as the name of the cluster or selects highly ranked words of the generalized sentences in the cluster as the name of the cluster.

The computing device on which the GSP system is implemented may include a central processing unit, memory, input devices (e.g., keyboard and pointing devices), output devices (e.g., display devices), and storage devices (e.g., disk drives). The memory and storage devices are computer-readable media that may contain instructions that implement the GSP system. In addition, the data structures and message structures may be stored or transmitted via a data transmission medium, such as a signal on a communications link. Various communications links may be used, such as the Internet, a local area network, a wide area network, or a point-to-point dial-up connection.

The GSP system may be implemented in various operating environments. Various well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The GSP system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
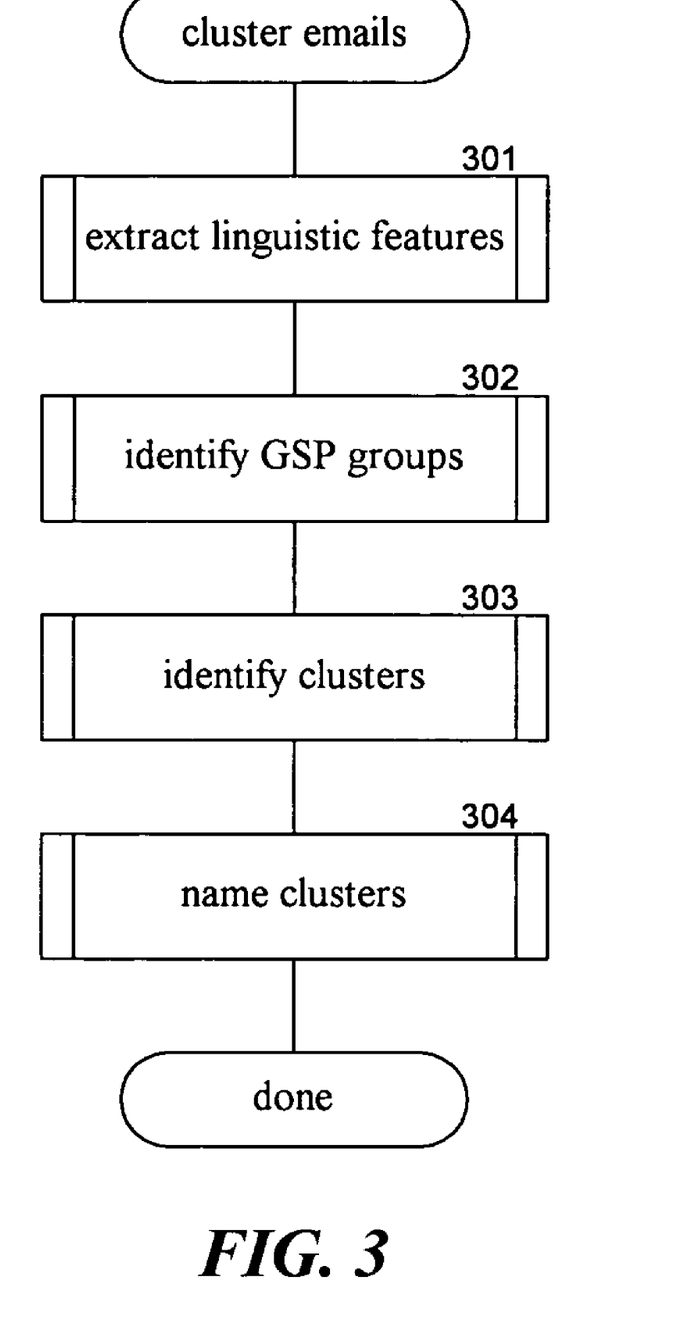
FIG. 3 is a flow diagram that illustrates the processing of the cluster emails component in one embodiment.
Figure 4:
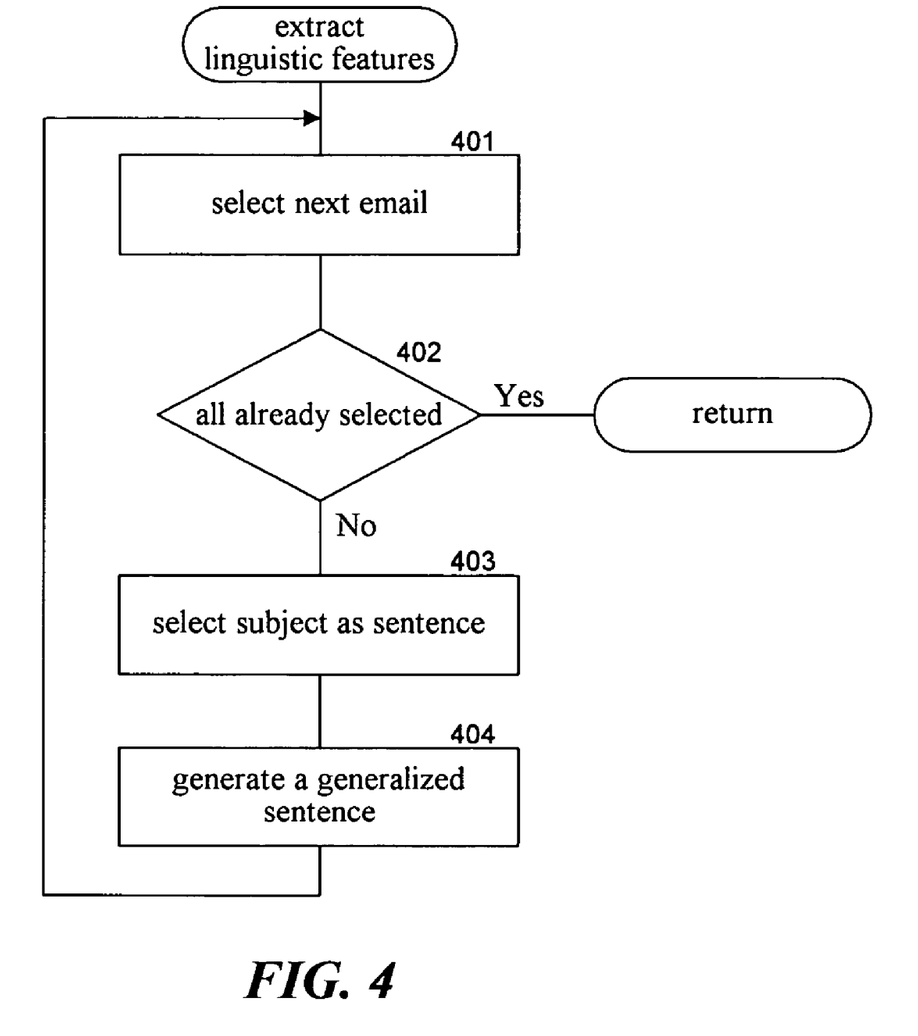
FIG. 4 is a flow diagram that illustrates the processing of the extract linguistic features component in one embodiment.

FIG. 3 is a flow diagram that illustrates the processing of the cluster emails component in one embodiment. In block 301, the component invokes the extract linguistic features component to generate the generalized sentences. In block 302, the component invokes the identify GSP groups component to identify groups to guide the clustering. In block 303, the component invokes the identify clusters component to perform the clustering. In block 304, the component invokes the name clusters component to name the identified clusters and then completes FIG. 4 is a flow diagram that illustrates the processing of the extract linguistic features component in one embodiment. The component loops, selecting each electronic mail message of the email store and invoking a natural language processor to generate a generalized sentence for the subject of the selected electronic mail message. In block 401, the component selects the next electronic mail message. In decision block 402, if all the electronic mail messages of the email store have already been selected, then the component returns, else the component continues at block 403. In block 403, the component selects the subject of the selected electronic mail message as the sentence. In block 404, the component generates a generalized sentence for the sentence by invoking a natural language processor. The component then loops to block 401 to select the next electronic mail message.

Figure 5:
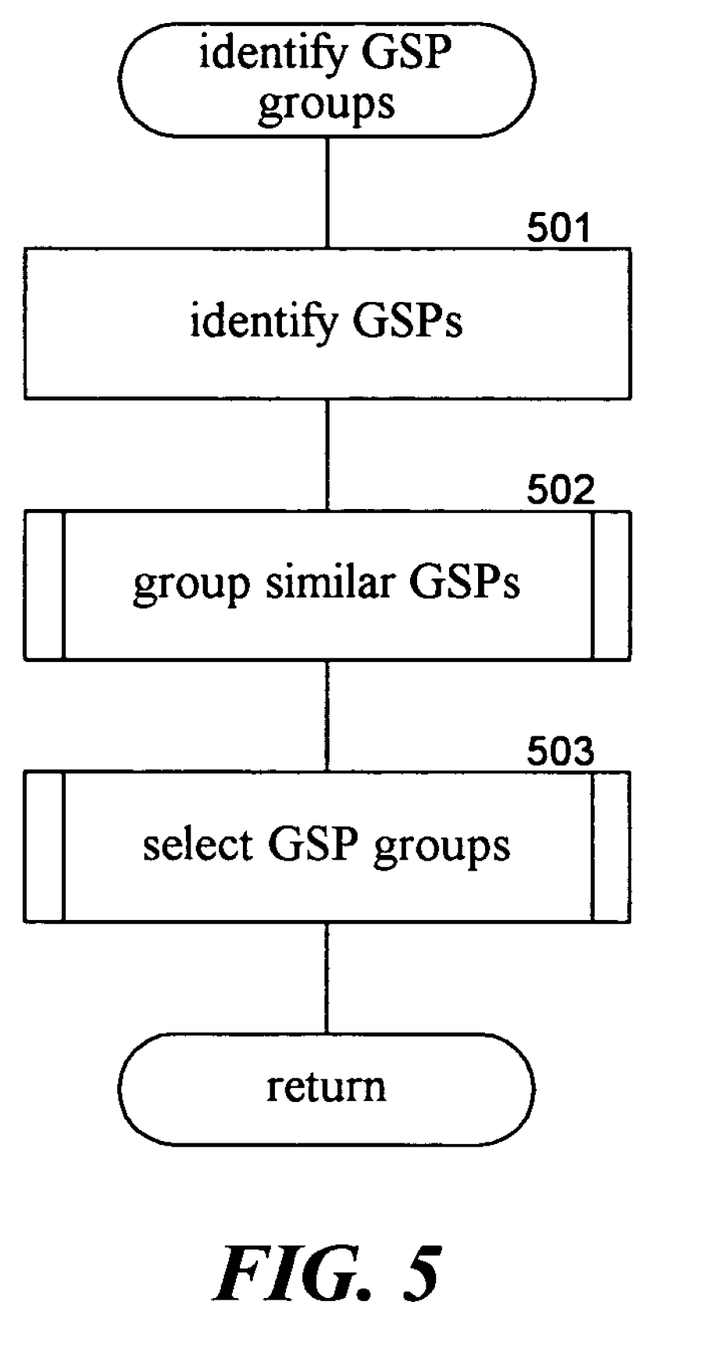
FIG. 5 is a flow diagram that illustrates the processing of the identify GSP groups component in one embodiment.

FIG. 5 is a flow diagram that illustrates the processing of the identify GSP groups component in one embodiment. In block 501, the component identifies the generalized sentence patterns of the generalized sentences. The component may use a frequent itemset algorithm to identify the generalized sentence patterns. The frequent itemset algorithm may identify "closed" itemsets. In block 502, the component invokes a group similar GSPs component to generate groupings of similar generalized sentence patterns. In block 503, the component invokes the select GSP groups component to select groups of generalized sentences to guide the clustering. The component then returns.

Figure 6:
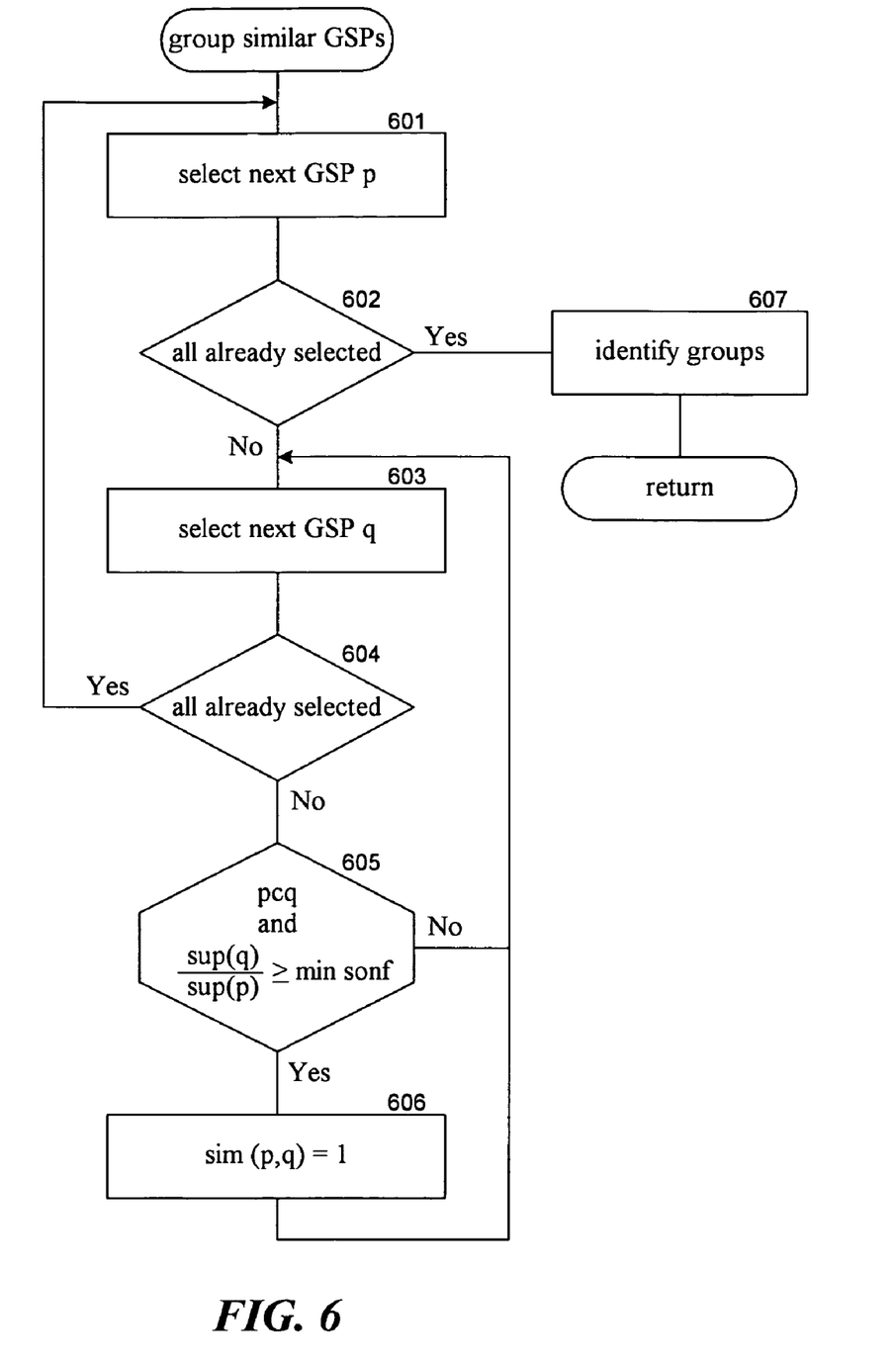
FIG. 6 is a flow diagram that illustrates the processing of the group similar GSPs component in one embodiment.

FIG. 6 is a flow diagram that illustrates the processing of the group similar GSPs component in one embodiment. The component loops, calculating the similarity between pairs of generalized sentence patterns and then applies a clustering algorithm to the similarity graph to identify the groups. In blocks 601-606, the component loops, selecting pairs of generalized sentence patterns and calculating their similarities. In block 601, the component selects the next generalized sentence pattern as the first of a pair. In decision block 602, if all the generalized sentence patterns have already been selected as the first of a pair, then the component continues at block 607, else the component continues at block 603. In block 603, the component selects the next generalized sentence pattern as the second of the pair. In decision block 604, if all the generalized sentence patterns have already been selected for the second of the pair for the currently selected first of the pair, then the component loops to block 601 to select the next generalized sentence pattern as the first of a pair, else the component continues at block 605. In decision block 605, if the first generalized sentence pattern of the pair is similar to the second generalized sentence pattern of the pair, then the component continues at block 606, else the component loops to block 603 to select the next generalized sentence pattern as the second of the pair. In block 606, the component indicates that the pair of generalized sentence patterns are similar and then loops to block 603 to select the next generalized sentence pattern as the second of the pair. In block 607, the component invokes a single-link clustering algorithm to identify groups of generalized sentence patterns based on the similarity graph. The component then returns.

Figure 7:
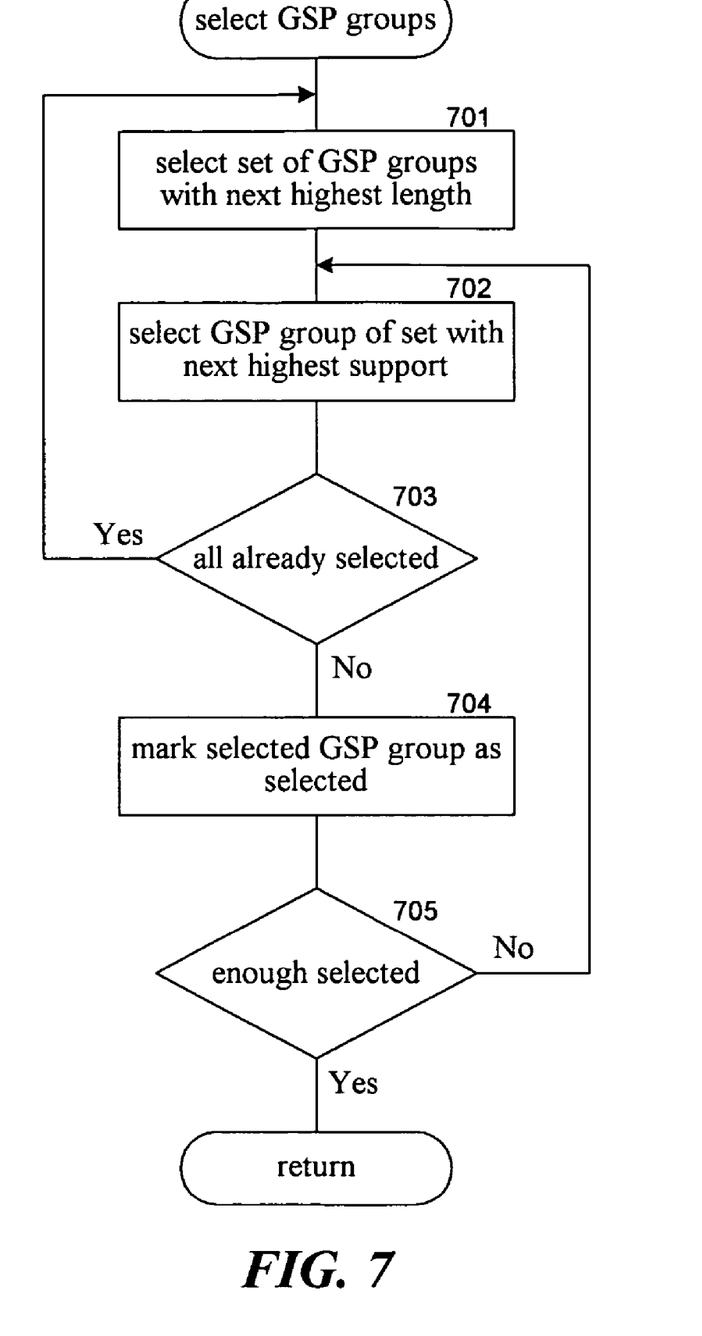
FIG. 7 is a flow diagram that illustrates the processing of the select GSP groups component in one embodiment.

FIG. 7 is a flow diagram that illustrates the processing of the select GSP groups component in one embodiment. In this embodiment, the component selects groups of generalized sentence patterns in an order based on the maximum length of a generalized sentence pattern within the group and when multiple generalized sentence patterns have the same length within a group, based on the support of the generalized sentence patterns. In block 701, the component selects a set of generalized sentence pattern groups with the next longest length. In block 702, the component selects the group of the set with the next highest support. In decision block 703, if all the groups of generalized sentence patterns of the selected set have already been selected, then the component loops to block 701 to select the next group of generalized sentence patterns within the selected set, else the component continues at block 704. In block 704, the component marks the selected group of generalized sentence patterns as having been selected. In decision block 705, if enough groups of generalized sentence patterns have already been selected, then the component returns, else the component loops to block 701 to select the next group of generalized sentence patterns within the selected set.

Figure 8:
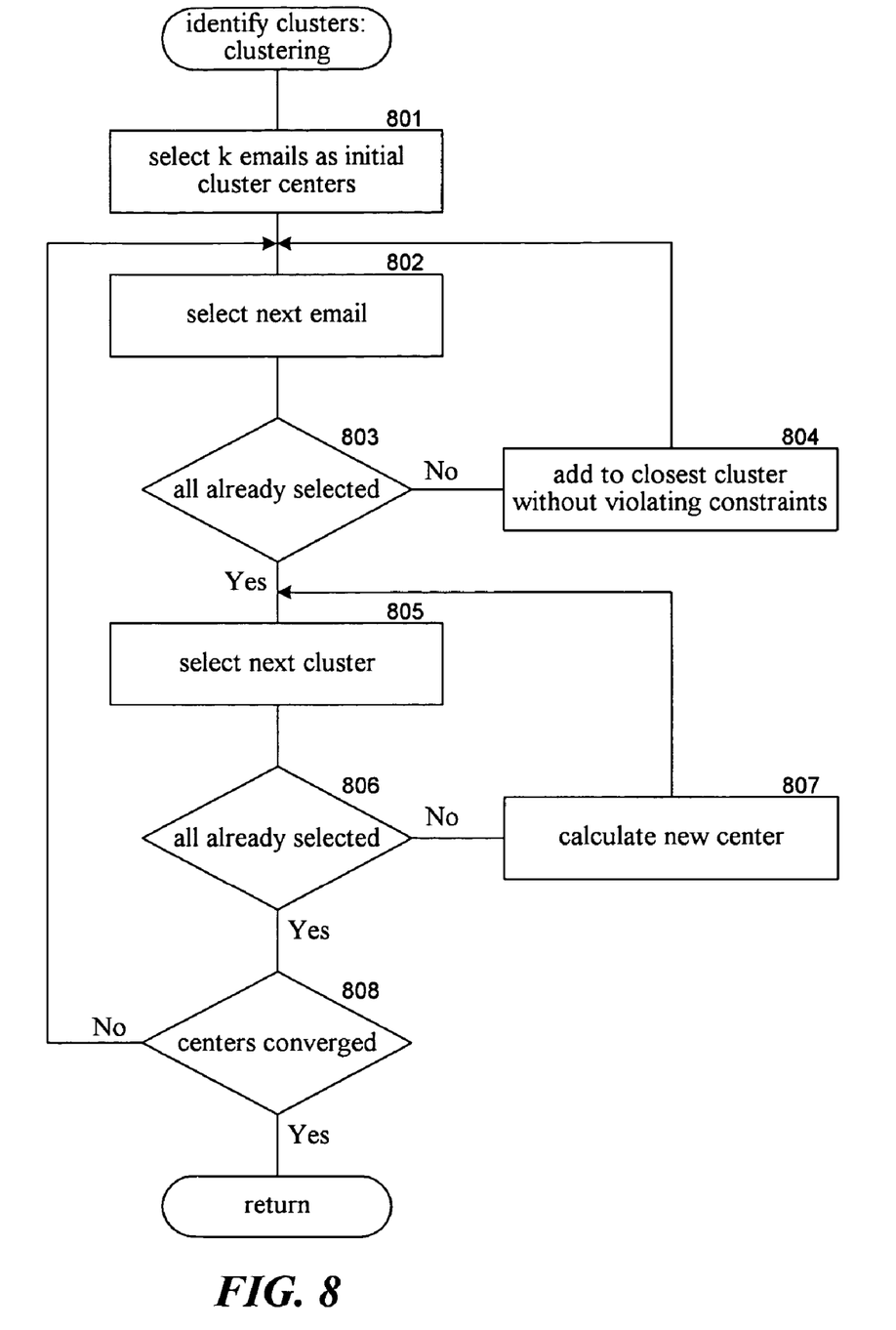
FIG. 8 is a flow diagram that illustrates the processing of the identify clusters algorithm that is based on a COP-KMeans algorithm in one embodiment.

FIG. 8 is a flow diagram that illustrates the processing of the identify clusters algorithm that is based on a COP-KMeans algorithm in one embodiment. In block 801, the component selects a specified number of generalized sentences as initial cluster centers. A cluster center is the average of all the generalized sentences within the cluster. To calculate a cluster center, the component represents each document by a feature vector of word weights calculated using a term frequency by inverse document frequency metric (TF*IDF). The average of the feature vectors for all the documents represented by the generalized sentences of a cluster represent the center. In block 802, the component selects the next generalized sentence. In decision block 803, if all the generalized sentences have already been selected, then the component continues at block 805, else the component continues at block 804. In block 804, the component adds the selected generalized sentence to the closest cluster based on cluster centers without violating a constraint, then loops to block 802 to select the next generalized sentence. In block 805, the component selects the next cluster, starting with the first. In decision block 806, if all the clusters have already been selected, then the component continues at block 808, else the component continues at block 807. In block 807, the component calculates a new center for the selected cluster, such as averaging the weight to the generalized sentences within the cluster, and then loops to block 805 to select the next cluster. In decision block 808, if the centers of the clusters have converged, then the component returns, else the component loops to block 802 to select the next generalized sentence.

Figure 9:
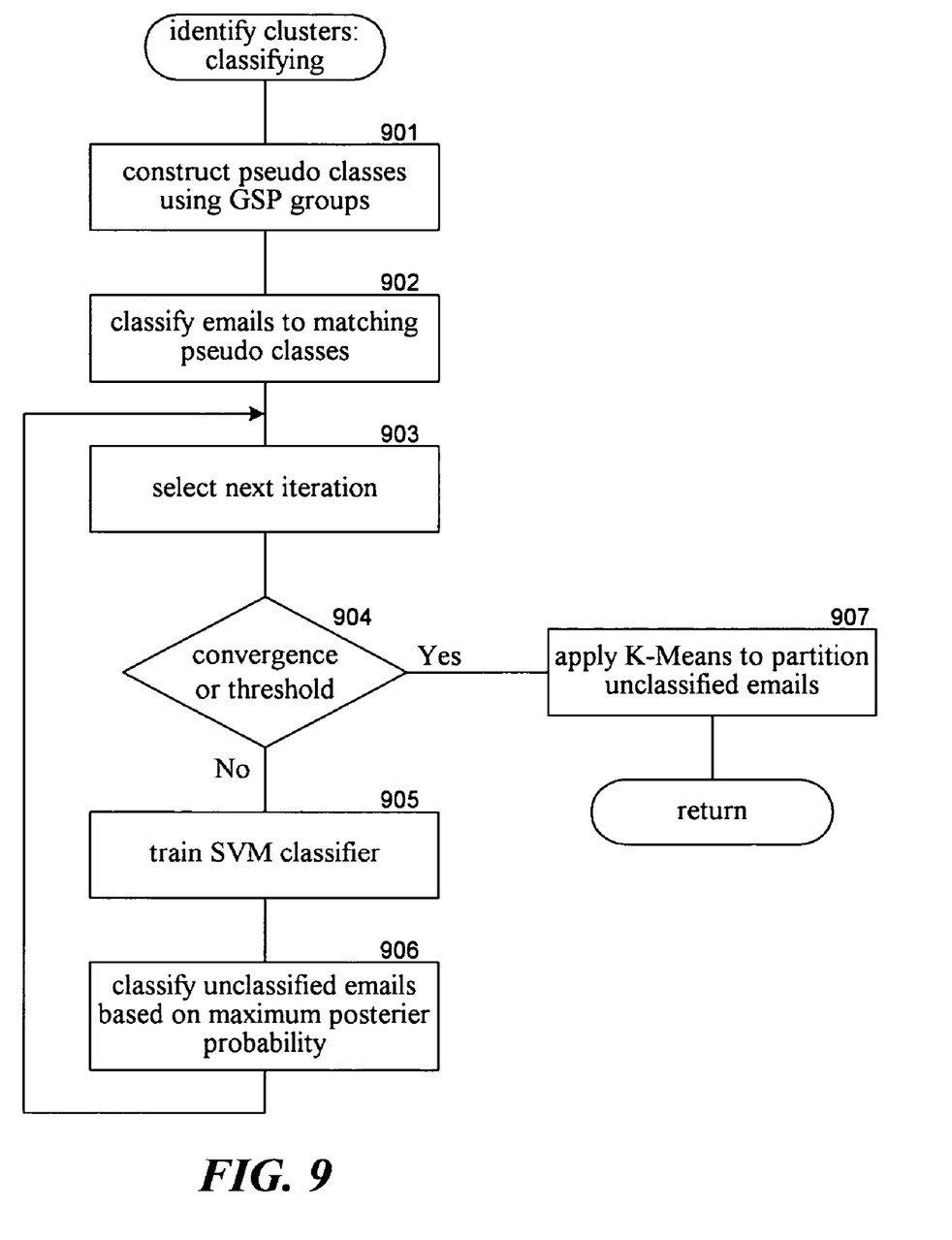
FIG. 9 is a flow diagram that illustrates the processing of the identify clusters algorithm that is based on a CEM algorithm in one embodiment.

FIG. 9 is a flow diagram that illustrates the processing of the identify clusters algorithm that is based on a CEM algorithm in one embodiment. In block 901, the component constructs pseudo-classes using the groups of generalized sentence patterns. In block 902, the component classifies generalized sentences to match the pseudo-classes. In blocks 903-906, the component loops, training a classifier and classifying the generalized sentences. In block 903, the component starts a new iteration. In decision block 904, if the results of the classification convergence or a threshold number of iterations has been performed, then the component continues at block 907, else the component continues at block 905. In block 905, the component trains the support vector machine classifier based on the classifications of the previous iterations. In block 906, the component classifies unclassified generalized sentences based on a maximum posterior probability, then loops to block 903 to start the next iteration. In block 907, the component applies a K-Means algorithm to cluster any unclassified generalized sentences and then returns.

Figure 10:
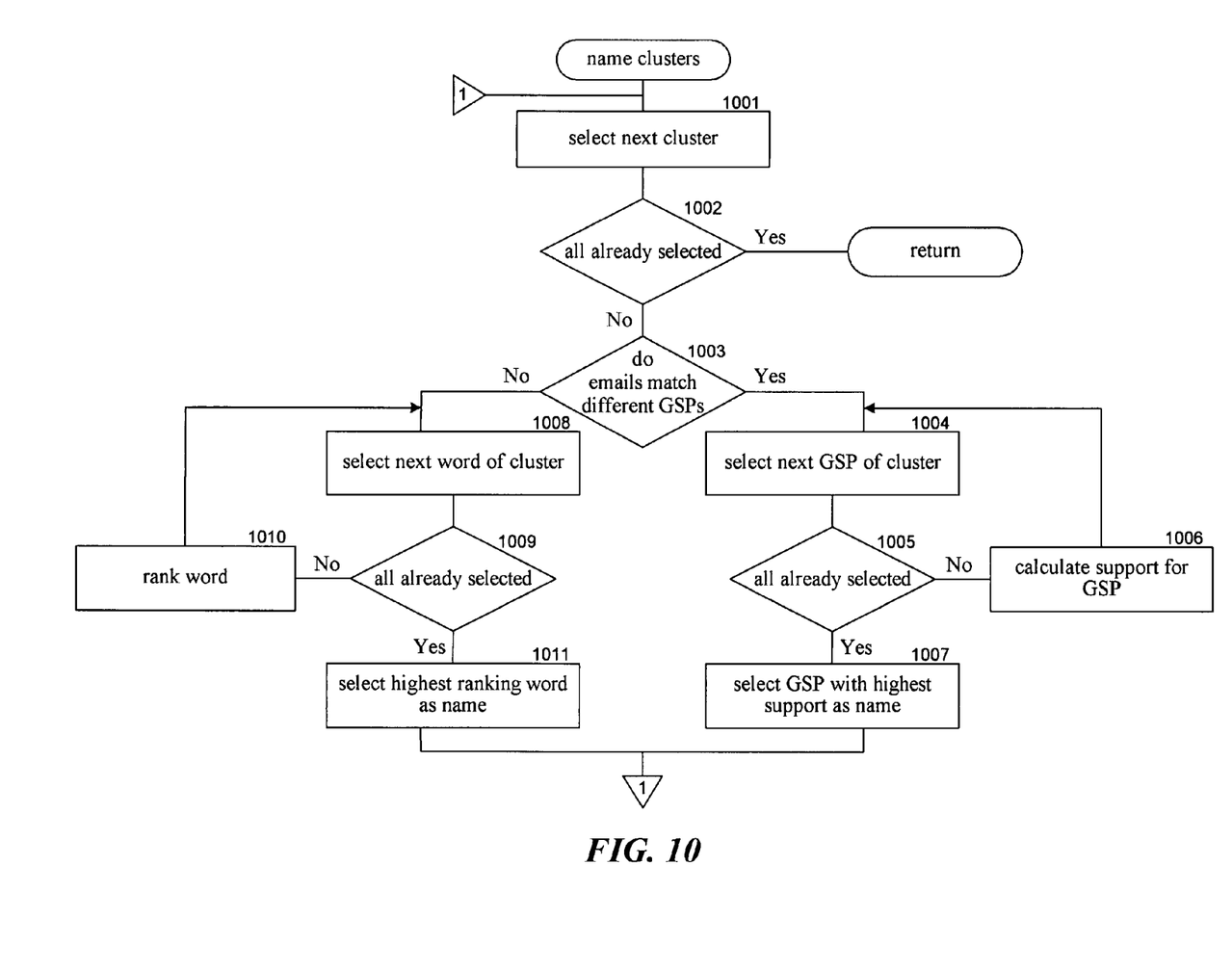
FIG. 10 is a flow diagram that illustrates the processing of the name clusters component in one embodiment.

FIG. 10 is a flow diagram that illustrates the processing of the name clusters component in one embodiment. In blocks 1001-1011, the component loops, selecting clusters and generating names for the selected clusters. In block 1001, the component selects the next cluster starting with the first. In decision block 1002, if all the clusters have already been selected, then the component returns, else the component continues at block 1003. In decision block 1003, if enough generalized sentences of the selected cluster match one or more groups of generalized sentences within the cluster, then the component continues at block 1004, else the component continues at block 1008. In block 1004, the component selects the next generalized sentence pattern of the selected cluster. In decision block 1005, if all the generalized sentence patterns have already been selected, then the component continues at block 1007, else the component continues at block 1006. In block 1006, the component calculates support for the selected generalized sentence pattern within the selected cluster, then loops to block 1004 to select the next generalized sentence pattern of the selected cluster. In block 1007, the component selects the generalized sentence pattern with the highest support as the name for the selected cluster and then loops to block 1001 to select the next cluster. In block 1008, the component selects the next word of a generalized sentence of the selected cluster. In decision block 1009, if all the words of the selected cluster have already been selected, then the component continues at block 1011, else component continues at block 1010. In block 1010, the component ranks the selected words and then loops to block 1008 to select the next word. In block 1011, the component selects the highest ranking words as the name of the selected cluster and then loops to block 1001 to select the next cluster.

One skilled in the art will appreciate that although specific embodiments of the GSP system have been described herein for purposes of illustration, various modifications may be made without deviating from the spirit and scope of the invention. One skilled in the art will also appreciate that various combinations of the described algorithms may be used. For example, the generalized sentence patterns need not be grouped, the frequent itemset need not be closed, and so on. Accordingly, the invention is not limited except by the appended claims.

We claim:

1. A method in a computer system with a processor and memory for identifying clusters of documents, the method comprising:

providing sentences having words, each sentence representing a topic of a document;

for each sentence representing the topic of a document, identifying a generalized sentence for the sentence, the generalized sentence representing a generalization of words of the sentence, a generalization including a part of speech of a word;

identifying by the processor generalized sentence patterns for the identified generalized sentences, each generalized sentence pattern representing a pattern of generalizations of the generalized sentences;

grouping the identified generalized sentence patterns into groups of generalized sentence patterns based on similarity of the generalized sentence patterns;

selecting identified generalized sentence patterns to guide the identification of clusters wherein the groups of generalized sentence patterns are used to guide the identification of clusters; and applying a cluster identification algorithm to identify clusters of documents using the selected generalized sentence patterns to guide the identification such that documents whose generalized sentences are similar to the same generalized sentence pattern are identified as being in the same cluster wherein similarity of generalized sentence patterns is defined as:

$$sim(p, q) = \begin{cases} 1, & p \subset q \wedge \frac{sup(q)}{sup(p)} \geq \text{min\_conf} \\ 0, & \text{otherwise} \end{cases} \quad (3)$$

where sim(p,q) represents the similarity of generalized sentence pattern p to generalized sentence pattern q, min conf represents a minimum confidence needed to establish similarity, and sup(p) represents support of generalized sentence p to be a generalized sentence pattern defined as:

$$sup(p) = |\{s | s \in S \wedge p \subseteq s\}|$$

where s is a generalized sentence in the set of sentences S.

2. The method of claim 1 generalized sentence patterns are similar when one generalized sentence pattern is a subset of another generalized sentence pattern and the ratio of support for the other generalized sentence pattern to support for the generalized sentence pattern is greater than a minimum threshold.

3. The method of claim 1 wherein the grouping uses a single-link clustering algorithm.

4. The method of claim 1 wherein groups of generalized sentence patterns are selected for guiding the identification of clusters based on length and support of generalized sentence patterns in each group.

5. The method of claim 1 wherein the documents are electronic mail messages and the topics are subjects of the electronic mail messages.

6. The method of claim 1 wherein the documents are web pages.

7. The method of claim 1 including automatically selecting a name for a cluster based on generalized sentence patterns of the cluster.

8. A method in a computer system with a processor and memory for identifying clusters of documents, the method comprising:

identifying by the processor generalized sentence patterns for sentences, each sentence representing a document;

grouping the identified generalized sentence patterns into groups of generalized sentence patterns based on similarity of the generalized sentence patterns;

selecting identified generalized sentence patterns to guide the identification of clusters wherein the groups of generalized sentence patterns are used to guide the identification of clusters; and applying a cluster identification algorithm to identify clusters using the selected generalized sentence patterns to guide the identification wherein the cluster identification algorithm is a constraint-based k-means algorithm and wherein similarity of generalized sentence patterns is defined as:

$$sim(p, q) = \begin{cases} 1, & p \subset q \wedge \frac{sup(q)}{sup(p)} \geq \text{min\_conf} \\ 0, & \text{otherwise} \end{cases} \quad (3)$$

where sim(p,q) represents the similarity of generalized sentence pattern p to generalized sentence pattern q, min_conf represents a minimum confidence needed to establish similarity, and sup(p) represents support of generalized sentence p to be a generalized sentence pattern defined as:

$sup(p) = |\{s | s \in S \wedge p \subseteq s\}|$ where s is a generalized sentence in the set of sentences S.

9. The method of claim 8 wherein a constraint is that when two generalized sentences match a group of generalized sentence patterns, the two generalized sentences are in the same cluster.

10. The method of claim 9 wherein a generalized sentence matches a group of generalized sentence patterns when the generalized sentence is a superset of a generalized sentence pattern of the group.

11. A method in a computer system with a processor and memory for identifying clusters of documents, the method comprising:

identifying by the processor generalized sentence patterns for sentences, each sentence representing a document;

grouping the identified generalized sentence patterns into groups of generalized sentence patterns based on similarity of the generalized sentence patterns;

selecting identified generalized sentence patterns to guide the identification of clusters wherein the groups of generalized sentence patterns are used to guide the identification of clusters; and applying a cluster identification algorithm to identify clusters using the selected generalized sentence patterns to guide the identification wherein the cluster identification algorithm is a conditional expectation maximization algorithm and wherein similarity of generalized sentence patterns is defined as:

$$sim(p, q) = \begin{cases} 1, & p \subset q \wedge \frac{sup(q)}{sup(p)} \geq \text{min\_conf} \\ 0, & \text{otherwise} \end{cases} \quad (3)$$

where sim(p,q) represents the similarity of generalized sentence pattern p to generalized sentence pattern q, min_conf represents a minimum confidence needed to establish similarity, and sup(p) represents support of generalized sentence p to be a generalized sentence pattern defined as:

$sup(p) = |\{s | s \in S \wedge p \subseteq s\}|$ where s is a generalized sentence in the set of sentences S.

12. The method of claim 11 wherein a support vector machine is a classifier for the conditional expectation maximization algorithm.

13. The method of claim 11 including upon completion of iterations of the conditional expectation maximization algorithm, applying a k-means algorithm to generate clusters for generalized sentence patterns that are not classified.

* * * * *

UNITED STATES PATENT AND TRADEMARK OFFICE
CERTIFICATE OF CORRECTION

PATENT NO. : 7,584,100 B2  Page 1 of 1
APPLICATION NO. : 10/880662
DATED : September 1, 2009
INVENTOR(S) : Zhang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1371 days.

Signed and Sealed this

Fourteenth Day of September, 2010

David J. Kappos
*Director of the United States Patent and Trademark Office*